United States Patent [19]

Myrick

[11] 4,236,412

[45] Dec. 2, 1980

[54] PRESSURE TRANSMITTING APPARATUS

[76] Inventor: Alma L. Myrick, P.O. Box 119, Texarkana, Ark. 75502

[21] Appl. No.: 15,793

[22] Filed: Feb. 27, 1979

[51] Int. Cl.³ .............................................. G01L 7/16
[52] U.S. Cl. ...................................... 73/706; 73/744
[58] Field of Search .................................. 73/706, 744

[56] References Cited

U.S. PATENT DOCUMENTS

| | | | |
|---|---|---|---|
| 1,828,093 | 10/1931 | Ailman | 73/706 |
| 2,481,651 | 9/1949 | Fitzpatrick | 73/706 |
| 3,415,123 | 12/1968 | Broughton | 73/706 |
| 3,521,491 | 7/1970 | Limbach | 73/706 |
| 4,050,312 | 9/1977 | Myrick | 73/706 |

FOREIGN PATENT DOCUMENTS 548349  9/1956  Italy ........................................ 73/706

*Primary Examiner*—Donald O. Woodiel

*Attorney, Agent, or Firm*—Jacobi, Lilling, Siegel & Presta

[57] ABSTRACT

This invention provides a pressure transmitting and sealing apparatus between a high or low pressure fluid line and a gauge monitoring the pressure of the fluid in the line. This apparatus transmits pressure fluctuations between the measured fluid and a dissimilar fluid in the standing line connected to the measuring gauge. The invention is particularly applicable in instances where the ambient temperature is below the freezing point of the measured fluid and a non-freezing fluid is required in the standing line and gauge. The apparatus comprises an in-line piston and cylinder unit which transmits variations in the pressure in the measured line to the fluid in the standing line to the gauge, while maintaining separation of the two fluids and at the same time allowing the non-freezing fluid in the standing line to lubricate the piston and cylinder. In the event of a break in the standing line, the piston will prevent leakage from the measured fluid line.

3 Claims, 3 Drawing Figures

PRESSURE TRANSMITTING APPARATUS

BACKGROUND AND SUMMARY OF THE INVENTION

In the petroleum industry, both drilling operations and in refining, pressurized fluids must be monitored continuously and temperatures below the freezing point of the flowing fluids are often encountered. The moving fluids resist freezing; however, the standing fluid in the lines to the monitoring gauges and in the gauges themselves often freeze since the fluid is essentially stationary. Various methods are employed to counteract this freezing in the standing lines. Heat strips are wrapped around the lines and gauges, warm water is sprayed on the lines and gauges, and other means are employed. Due to the high or low pressures that may be involved, e.g., from 10 PSI to 500 PSI, no satisfactory seal has previously been found which could separate the measured fluid from a non-freezing fluid which could be used in the standing line and monitoring gauge. The invention presented here eliminates these longstanding problems by providing a sealing piston which transmits the pressure variations of the measured fluid to a separate dissimilar fluid in the standing line and gauge which will not freeze at the temperatures encountered and will keep the two fluids substantially separated.

A bushing is provided which screws or otherwise attaches to the pipe line, or a cut-off valve thereon, carrying the fluid to be monitored. This bushing is threaded on the inside to accommodate a piston cylinder. The piston cylinder is fitted into the bushing and a tight fitting piston made from any suitable material is slidably disposed within the cylinder. A thick walled pressure pipe with the end machined flat is screwed into the open end of the piston cylinder and provides a sealing surface against which the piston end may seat. The standing gauge pipe and gauge are filled with suitable non-freezing and lubricating fluid and sealed. The piston under pressure from the fluid to be monitored transmits the pressure to the fluid in the standing pipe and pressure gauge while substantially separating the two fluids at opposite ends of the piston. When there is no pressure in the monitored fluid pipe, the piston seats against the shoulder of the bushing to prevent the fluid in the standpipe and gauge from leaking.

In case of a break in the line between the piston and the gauge, the piston will prevent the leakage of fluid from the pipe line. Accordingly, the apparatus of the present invention serves also as a safety device.

DESCRIPTION OF THE PREFERRED EMBODIMENTS

Figures 1, 2, 3:
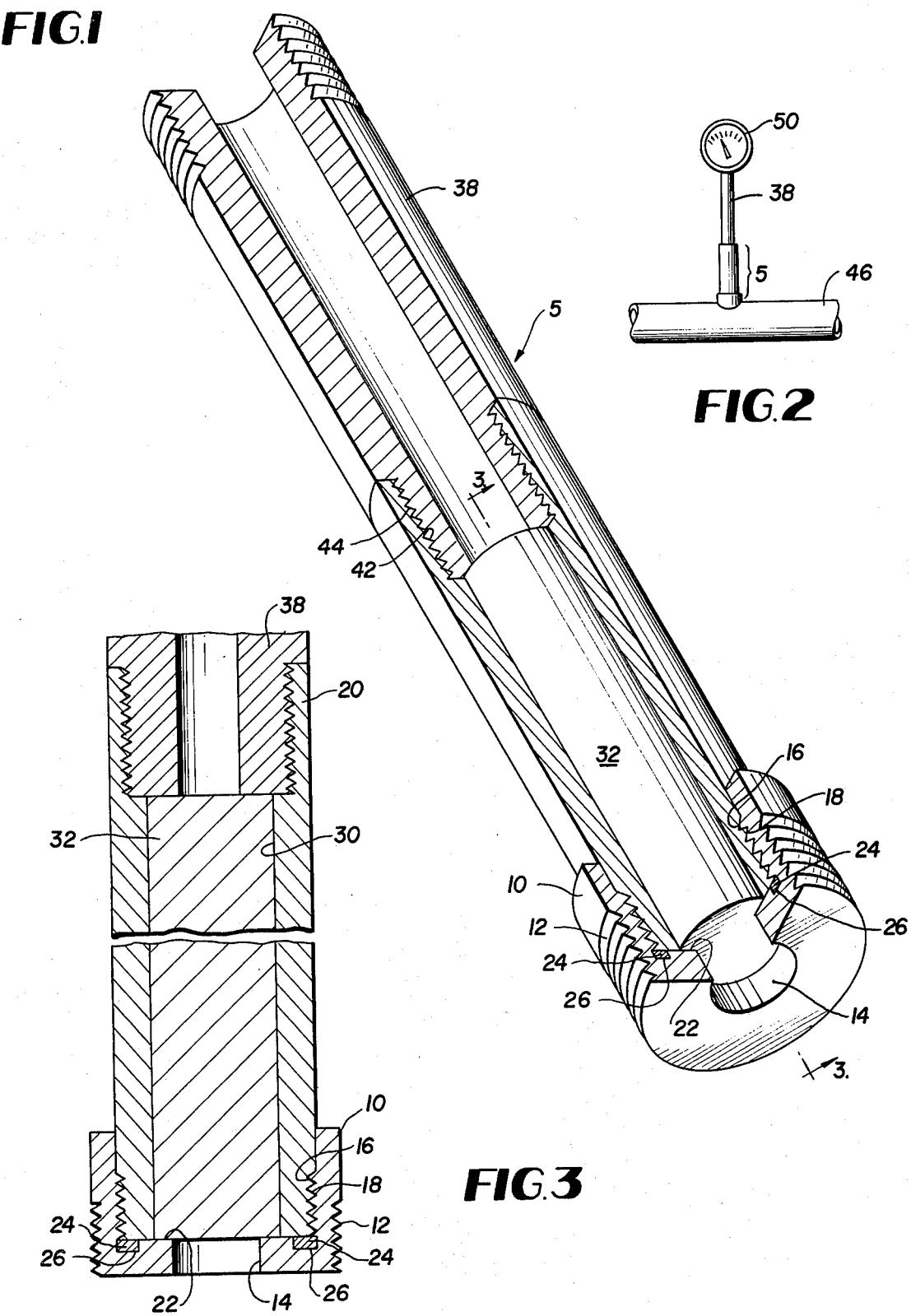
FIG. 1 is a cutaway perspective view of the apparatus of this invention, illustrating the component parts and construction thereof.
FIG. 2 is an elevational view of the apparatus of the present invention installed on a pipeline in its relationship with a monitoring pressure gauge.
FIG. 3 is a sectional view taken along line 3—3 of FIG. 1.

Referring now to FIG. 1, the apparatus 5 of the present invention comprises a bushing 10 machined of steel or similar suitable material with male threads 12 provided to be screwed into a flow pipe or cut-off valve at the point where monitoring of the pressure is desired.

The bushing is provided with a hole 14 which passes through the bushing 10. The interior of the bushing 10 is provided with female threads 16 which mate with the male threads 18 on a piston cylinder 20. The bushing 10 is provided with an interior shoulder 22 into which is machined or otherwise provided a groove 24 in the region contacted by the end of the piston cylinder 20 when the bushing 10 and sleeve 20 are screwed together. An O ring 26 made of neoprene or other suitable material is fitted in the groove 24.

The piston cylinder 20 preferably is made of steel or other suitable material of sufficient strength to withstand expected pressures or heat and is machined on the inside to provide a smooth inner surface 30.

A piston 32, formed of stainless steel or any other suitable material, is slidably disposed within the cylinder 20 and is provided with a smooth outer surface. The outer diameter of the piston 32 is only slightly smaller than the inner diameter of the cylinder 20. As an illustrative example, the outer piston diameter may be only one-two thousandth of an inch smaller than the inner diameter of the cylinder.

A standpipe 38 or bushing is disposed at the opposite end of the cylinder 20 and is formed of a tube or pipe of any suitable material with thick walls and a shoulder 40 which abuts against a recessed annular shoulder 42 on the end of the cylinder 20. The standpipe 38 or bushing is secured to the cylinder 20 by mating threads 44 on the two members.

The travel of the piston 32 within the cylinder 20 is limited to a short distance by the shoulders 22 and 40 on either end of the cylinder 30.

In operation, the apparatus 5 of this invention is screwed into a hole in a flow pipe or cut-off valve 46, as shown in FIG. 2. The standpipe 38 is filled with the desired fluid through a bleed off valve (not shown) or fitting commonly found on such gauges.

The desired fluid is forced into the gauge and standpipe 38 which forces the piston 32 to seat against the shoulder 22 on the bushing 10, and a very small quantity of this fluid finds its way between the piston 32 and cylinder wall 30 to lubricate them and serve as a seal therebetween. In some cases, it may be necessary to calibrate the gauge to "0" PSI with positive pressure in the gauge and standpipe from the fluid contained.

When drilling mud or other fluid passes through the flow pipe 46, the pressure in the flow pipe is transmitted through the piston 32 to the fluid in the standpipe 38 and the gauge 50. Since fluids have a very limited compressibility, only slight movement of the piston 32 is required to transmit pressure fluctuations. When there is no pressure in the flow pipe 46, the piston 32 is forced down and seats against the shoulder 22 of bushing 10.

While the ilustration presented is directed toward problems in the oil industry involving drilling mud and similar fluids and sub-freezing temperatures, it is recognized that a wide range of applications may be made of this device and that any suitable fluids may be used therein.

What is claimed is:

1. Apparatus for transferring pressure from a flow line having a first fluid therein to a standby line having one end in communication with said flow line, said standby line having a closed column of a second fluid and a pressure indicating means therein, said apparatus comprising a stainless steel piston mounted for limited axial movement in said standby line when subjected to pressure, said piston being disposed between said flow line and said indicating means, said standby line comprising a sleeve having said piston mounted therein, and means for limiting the axial movement of said piston in said sleeve to a short distance, said limiting means comprising inwardly extending shoulders adjacent the ends of said sleeve, the diameter of said piston being slightly less than the inside diameter of said sleeve, the outer surface of said piston and the inner surface of said sleeve being smooth, substantially cylindrical and of substantially constant diameter, and said second fluid being disposed between said piston and said sleeve to serve as a lubricating and sealing means therebetween, whereby pressure in said flow line is transferred to said piston to effect limited movement thereof and to subject said second fluid and said fluid indicating means to said pressure.

2. The apparatus of claim 1 werein said second fluid is a non-freezing fluid.

3. Apparatus for transferring pressure from a flow line having a first fluid therein to a standby line having one end in communication with said flow line, said standby line having a closed column of a second fluid and a pressure indicating means therein, said apparatus comprising a piston mounted for limited axial movement in said standby line when subjected to pressure, said piston being disposed between said flow line and said indicating means, said standby line comprising a sleeve having said piston mounted therein, and means for limiting the axial movement of said piston in said sleeve to a short distance, said limiting means comprising inwardly extending shoulders adjacent the ends of said sleeve, the diameter of said piston being approximately one-two thousandth of an inch less than the inside diameter of said sleeve, the outer surface of said piston and the inner surface of said sleeve being smooth, substantially cylindrical and of substantially constant diameter, and said second fluid being disposed between said piston and said sleeve to serve as a lubricating and sealing means therebetween, whereby pressure in said flow line is transferred to said piston to effect limited movement thereof and to subject said second fluid and said fluid indicating means to said pressure.

* * * * *